United States Patent [19]

Berth et al.

[11] 4,339,014

[45] Jul. 13, 1982

[54] AIR COOLING SYSTEM FOR DRIVE ENGINE OF AN AUTOMOTIVE AGRICULTURAL MACHINE

[75] Inventors: Dieter Berth; Gottfried Hohlfeld, both of Neustadt in Sachsen; Klaus Oliva, Langburkersdorf; Christian Noack, Guttau, all of German Democratic Rep.

[73] Assignee: VEB Kombinat Fortschritt Landmaschinen Neustadt in Sachsen, Neustadt in Sachsen, German Democratic Rep.

[21] Appl. No.: 103,424

[22] Filed: Dec. 14, 1979

[30] Foreign Application Priority Data

Dec. 27, 1978 [DD] German Democratic Rep. ... 210144

[51] Int. Cl.³ ............................................. B60K 11/08
[52] U.S. Cl. ............................ 180/54 A; 180/68 R; 180/69 R
[58] Field of Search ............... 180/54 A, 68 R, 69 R; 98/4, 18

[56] References Cited

U.S. PATENT DOCUMENTS

| | | | |
|---|---|---|---|
| 1,920,883 | 8/1933 | Perkins | 123/174 |
| 3,575,524 | 4/1971 | Adajian | 415/213 |
| 4,071,009 | 1/1978 | Kraina | 180/54 A X |
| 4,160,487 | 7/1979 | Kunze et al. | 180/54 A X |

FOREIGN PATENT DOCUMENTS

| | | |
|---|---|---|
| 2218747 | 9/1974 | France . |
| 2318049 | 7/1975 | France . |
| 107565 | 8/1974 | German Democratic Rep. . |
| 117585 | 1/1976 | German Democratic Rep. . |
| 128200 | 1/1976 | German Democratic Rep. . |
| 129540 | 12/1976 | German Democratic Rep. . |
| 313696 | 4/1956 | Switzerland ............ 180/54 A |

*Primary Examiner*—Joseph F. Peters, Jr.
*Assistant Examiner*—Donald W. Underwood
*Attorney, Agent, or Firm*—Karl F. Ross

[57] ABSTRACT

The invention relates to an air-cooling system for a drive engine of an automotive agricultural machine, in particular a field chopper.

It is a goal of this invention to provide a forced-air cooling system with considerable cooling capacity and a good cleaning effect for screens and the engine compartment. This object is attained by providing a cooling system where the warm air is blown upwardly and selectively to one side, a reversal of the cooling-air stream for cleaning the screens being possible, and a forced-air ventilating of the engine compartment being assured.

The basis of the invention is that an air compartment is provided with two fans mounted between a pair of radiators each behind a respective screen. An air-deflector plate is so arranged in the air compartment that it is possible to alternate the fans between radiators so that the cooling-air stream can pass in either direction through each of the radiators and screens. One fan meanwhile blows cooling air into the engine compartment, which air escapes upwardly through openings in the upper machine wall.

1 Claim, 2 Drawing Figures

4,339,014

AIR COOLING SYSTEM FOR DRIVE ENGINE OF AN AUTOMOTIVE AGRICULTURAL MACHINE

FIELD OF THE INVENTION

The invention relates to an air cooling system for the drive engine of an automotive agricultural vehicle, in particular a field chopper, wherein the cooling air is drawn via screens to the rear machine part and it is necessary to clear the radiators and screens to ensure cooling and to clean and ventilate the engine compartment to reduce a possibility of fire.

CHARACTERISTICS OF THE KNOWN TECHNICAL SOLUTIONS

In automotive agricultural machines, in particular grain and stalk-crop harvesters of large capacity, fouling of the radiator and screens is a great hindrance for the cooling of the drive motor and fouling of the drive motor creates a great risk of fire. In order to eliminate this disadvantage various means have been employed for cleaning the radiator, screen and drive motor. Cooling systems such as seen in East German Pat. Nos. 107,565 and 117,585 are known wherein the cooling air is sucked in by ventilators at the back of the machine and forced over the radiators in the motor room and then expelled outwardly over the drive motor toward the front. These cooling systems have the disadvantage that the screens cannot automatically be cleaned. It is further disadvantageous that the result of this type of air deflection is that the operator is subjected to increased dust, noise, and heat and as a result of the low travel speed with disadvantageous wind conditions this can result in a heat buildup in the engine compartment and to recirculating of the heated air through the cooling system. In other solutions clearing of the radiator and the screens takes place by reversing the stream of cooling air. Thus according to East German Pat. No. 128,200 a cooling system is known wherein a main fan is mounted horizontally between two radiators and a secondary fan is mounted vertically behind the drive engine. Air flaps are arranged adjacent the main and the secondary fans and connected together so that when the flaps are closed over the main ventilator those over the secondary ventilator are open toward the air compartment and the air current created by the secondary fan forces away the crop particles adhering to the screen. This solution has the disadvantage that the secondary fan only serves for cleaning of the screens, so it is necessary to provide a substantial flap system for reversing the cooling-air stream, when the engine compartment and the drive engine are dirtied on operation of the secondary fan by the low-pressure zone created in the engine room, and a transmission for driving the main ventilator is necessary. The cleaning effect of the air stream of the secondary fan is limited to the screens, since the throughput of the secondary fan is a great deal less than that of the main fan. It is further known from East German Pat. No. 129,540 to use a solution wherein above the air compartment a pivotal frame is provided with blower housing parts in which axial throughput fans are provided. The blower housing parts are mirror symmetrical to the frame plane. By turning the frame through 180° the air intake and air output openings reverse so that the air stream is effective oppositely and the water cooler and screens are cleaned. It is disadvantageous in this solution that it is not possible to ventilate the engine compartment. As a result heat builds up in the engine compartment and there is no cleaning of the drive engine. Furthermore sealing of the frame relative to the air compartment is complicated.

OBJECT OF THE INVENTION

It is an object of this invention to provide a forced-air cooling system and drive motor with considerable air throughput in order to achieve a high level of cooling and a large cleaning effect for the radiators, screens, and engine compartment.

SUMMARY OF THE INVENTION

It is an object of the invention to provide an air-cooling system for the drive engine of an automotive agricultural machine wherein the warm air blows from above and selectively from one side, wherein reversing of the cooling-air stream for cleaning the screens is possible with simple means and a forced ventilation of the engine compartment is possible.

This is achieved according to the invention in that there are provided, within an enclosure of screens between two radiators, two ventilators on a common drive shaft behind the drive engine in the end wall of an air compartment whose side walls are formed by the radiators so that there is between these radiators a pivotal air-deflection plate to direct the air stream from one ventilator to one radiator. In this manner the air compartment is subdivided diagonally by the air-deflection plate. Between the drive engine and the fan there is a partition which extends down from the upper machine wall to approximately the level of the common drive shaft for the fans. In front of this partition there are in the upper machine wall openings for ventilating the engine compartment and behind the partition similar openings for ventilating the exhaust system which is mounted between the upper machine wall and the air compartment.

As a result of the arrangement of the fans and the possible control of the air-deflection plate it is possible to suck cool air in through the radiator and then after pivoting of the air-deflection plate to blow out through the radiator and screen for cleaning. The drive shaft of the fans is preferably driven in a known manner by V-belts from a V-belt pulley of the drive engine. The air-deflection plate, which is between the two fans, can be controlled by an actuating mechanism from the operator's station on the agricultural machine. Thus the cooling air stream produced by the rear ventilator can, for example, be forced through the right radiator and the cooling air of the front fan is sucked in through the left radiator and forced out upwardly for cooling of the exhaust system and forced partially underneath the partition in order to prevent engine-compartment fouling and to reduce a buildup of heat in the engine compartment. On reversing the air-deflection plate the air of the rear fan is forced through the left radiator to clean it and the respective screen whereas on the other hand the front fan sucks air in through the right radiator. In this manner an alternating cleaning of the two radiators and the respective screens is possible. In addition fouling of the radiator and screens, for example in a field chopper, can be predicted so that the blowing effect can be through the radiator toward that side which as a result of the loading and wind conditions will have the most crop particles. As a result of blowing cooling air upwardly and toward the side of the greatest particle accumulation the stern and the other intake sides lie in a zone of limited particles. In order to separate out large particles the fan at the stern is provided behind a screen or as is known behind a cyclone.

EMBODIMENT

The invention is subsequently described more closely with reference to an embodiment. In the attached drawing.

Figure 1:
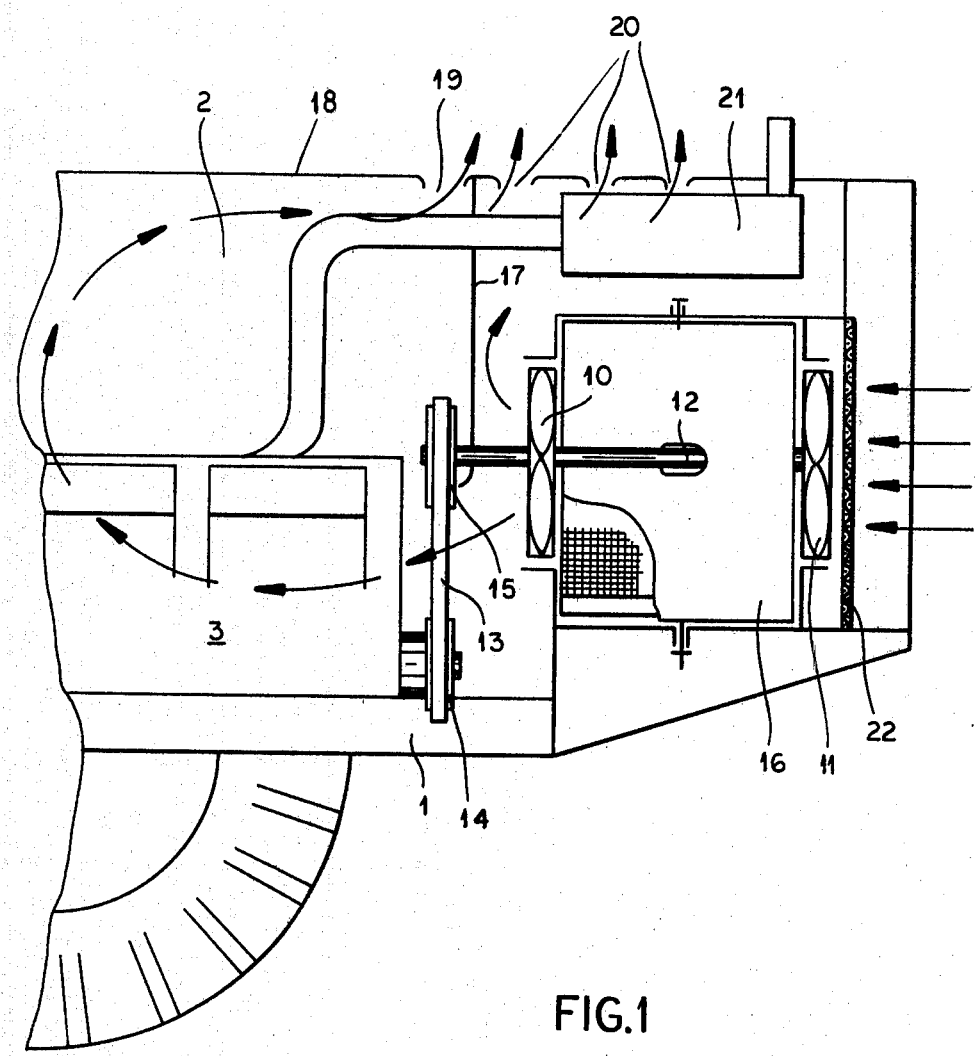
FIG. 1 is a side view with the cooling system in a chopper.
Figure 2:
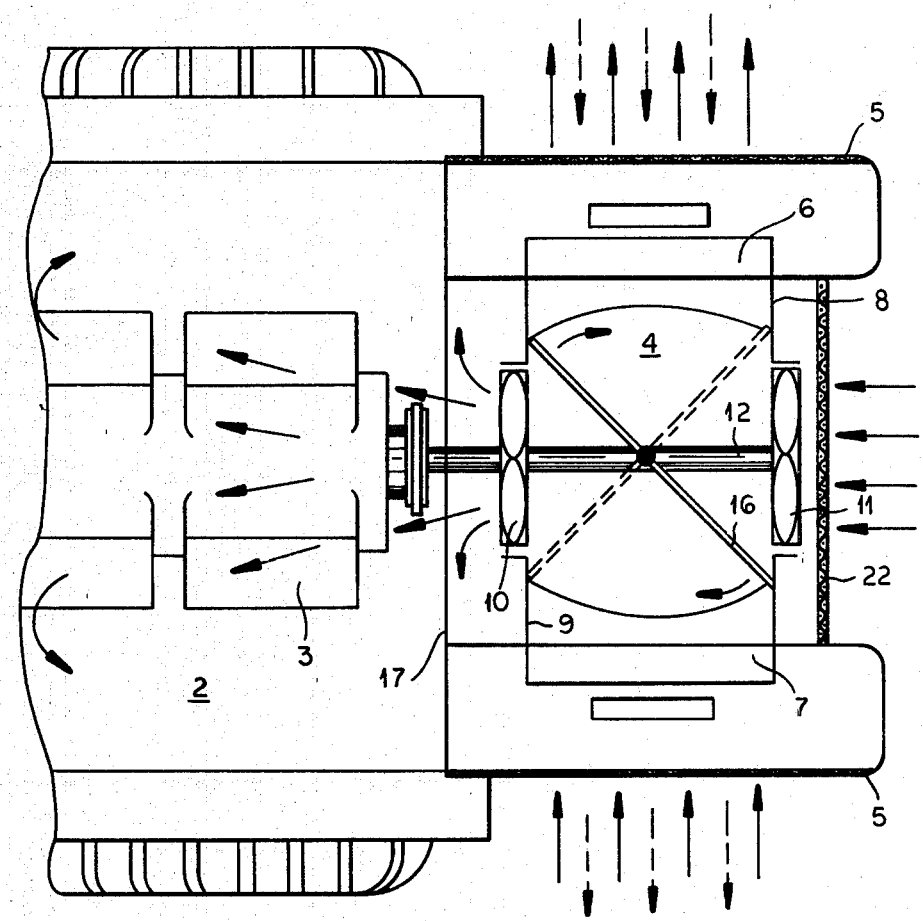
FIG. 2 is a top view of the cooling system.

In a not illustrated ground machine a drive engine 3 is in an engine compartment 2 of a rear frame 1. Behind the engine compartment 2 there is an air compartment 4 which is surrounded by an enclosure of screens 5 and 22. The sidewalls of the air compartment 4 are formed by radiators 6 and 7. In the end walls 8 and 9 of the air compartment 4 there are fans 10 and 11 on a common drive shaft 12 which is driven by means of a V-belt 13 which rides on V-belt pulleys 14 and 15 on the drive engine 3 and the drive shaft 12. Between the fans 10 and 11 there is a pivotal air-deflecting plate 16 which always diagonally subdivides the air compartment 4. Between the drive engine 3 and the fan 10 there is a partition 17 extending down from the upper machine wall 18 to about the drive shaft 12. In front of and behind this partition 17 there are in the upper machine wall 18 openings 19 and 20. In the space between the air compartment 4 and the upper machine wall 18 the exhaust system 21 of the drive engine 3 is secured and vented outwardly. In the illustrated position of the air-deflecting plate 16 the cooling-air stream of the fan 11 is directed through the radiator 6 and the cooling-air stream of the fan 10 through the radiator 7. In the dot-dash line position of the air-deflecting plate 16 the cooling-air stream of the fan 11 is directed through the radiator 7 and the cooling-air stream of the fan 10 through the radiator 6. In this manner the flow direction of the cooling air can be reversed on the radiators 6 and 7 and on the screens 5 relative to the first-given position of the air-deflecting plate 16. Through this possible switchover of the cooling-air stream direction the radiators 6 and 7 and the screens 5 provided in front of them are cleaned. The fan 10 sucks air through the radiator upstream of it as determined by the position of the air-deflecting plate and blows it partly upwardly through the openings 20 and thereby cools the exhaust system 21. The other portion of the cooling air is blown by fan 10 underneath the partition 17 for ventilating the engine compartment 2 and for cleaning the drive engine 3 in the compartment 2, and is guided upwardly through the opening 19. The fan 11 sucks cooling air through the screen 22 provided ahead of itself and forces this air through the corresponding radiator 6 or 7 as determined by the position of the air-deflecting plate.

We claim:

1. An air cooling system for the drive engine of an automotive agricultural machine with spaced-apart radiators, an exhaust system and an air compartment having side walls and end walls characterized in that two fans (10, 11) are mounted on a common drive shaft (12) behind a drive motor (3) one of said fans located in each end wall of the air compartment (4), each side wall being formed by one of said radiators (6, 7), a pivotal air-deflection plate (16) mounted between the fans (10, 11) so as to always be diagonal to the radiators, and the air compartment being divided into two subcompartments, the walls of each subcompartment always formed by one radiator (6, 7), one fan (10, 11) and the air-deflection plate (16), and between the drive engine (3) and the fans (10, 11) there is a partition (17) extending down from an upper machine wall (18) to the common drive shaft (12) and to both sides of the partition (17) there are openings (19, 20) in the upper machine wall (18) and between the air compartment (4) and the upper machine wall (18) there is the exhaust system (21) of the drive engine (3).

* * * * *